Patented Nov. 18, 1924.

1,516,350

UNITED STATES PATENT OFFICE.

KOLOMAN RÓKA, OF CONSTANCE, GERMANY, ASSIGNOR TO THE FIRM OF HOLZ-VERKOHLUNGS-INDUSTRIE AKTIEN-GESELLSCHAFT, OF CONSTANCE, BADENIA, GERMANY, A CORPORATION OF GERMANY.

METHOD OF CHLORINATING ACETYLENE.

No Drawing. Application filed September 1, 1922. Serial No. 585,806.

*To all whom it may concern:*

Be it known that I, KOLOMAN RÓKA, a citizen of Hungary, residing at Constance, Badenia, Germany, have invented certain new and useful Improvements in a Method of Chlorinating Acetylene, of which the following is a specification.

In my United States Patent No. 1,418,882 a method is described which consists in bringing chlorine and acetylene to reaction in the presence of steam at high temperature, preferably at a temperature between 400 and 500° C. I have now discovered that it is possible to carry out the method in the presence of catalyzers also at a temperature below 400° C., preferably at a temperature between 400° C. and 250° C.

Suitable catalyzers are the metallic chlorides, for example $CuCl_2$, $FeCl_3$ and $CaCl_2$. Either the entire quantity of steam or only part of the same is preferably superheated as described in Patent 1,418,882 previous to being supplied to the reaction chamber in order to produce the heat required for the starting and carrying through of the reaction.

The process is carried out in substantially the manner described in my Patent No. 1,418,882. The procedure is as follows:

Through a clay pipe which contains fragments of fire clay impregnated with a metal chloride, for example $CuCl_2$ or $CaCl_2$, acetylene and chlorine are passed in the proportions of 1 to 2, superheated steam being admitted at the same time.

Small quantities of steam, such as could be generated in a reaction chamber during the treatment of moist chlorine and moist acetylene (that is, at the normal temperature and pressure of the gases saturated with moisture), would certainly not be sufficient to produce the results obtained by my process.

The products of reaction passing out of the pipe contain besides the chlorination products only steam and hydrochloric acid. On condensation two layers are obtained, a lower heavy layer composed of the chlorination products, and an upper layer composed of a water solution of hydrochloric acid. After separating the two layers the several chlorination products can be obtained, for example, by fractional distillation.

I claim:—

1. The improved method of chlorinating acetylene which consists in bringing chlorine and acetylene to reaction in the presence of catalyzers with the aid of steam as diluting means at a temperature between 400° C. and 250° C.

2. The improved method of chlorinating acetylene which consists in bringing chlorine and acetylene to reaction in the presence of metallic chlorides with the aid of steam as diluting means at a temperature between 400° C. and 250° C.

3. The improved method of chlorinating acetylene which consists in causing chlorine and acetylene to act upon one another in the presence of catalyzers with the aid of superheated steam as a diluting means at a temperature between 400° and 250° C.

4. The improved method of chlorinating acetylene which consists in bringing chlorine and acetylene to reaction in the presence of metallic chlorides with the aid of superheated steam as diluting means at a temperature between 400° and 250° C.

In testimony whereof I have signed my name to this specification in the presence of two subscribing witnesses.

KOLOMAN RÓKA.

Witnesses:
  GEORG LOTTERHOS,
  HANS KRAUS.